United States Patent [19]
Davison

[11] Patent Number: 5,136,837
[45] Date of Patent: Aug. 11, 1992

[54] AIRCRAFT ENGINE STARTER INTEGRATED BOUNDARY BLEED SYSTEM

[75] Inventor: Samuel H. Davison, Milford, Ohio

[73] Assignee: General Electric Company, Cincinnati, Ohio

[21] Appl. No.: 489,150

[22] Filed: Mar. 6, 1990

[51] Int. Cl.$^5$ .............................................. F02C 7/00
[52] U.S. Cl. ................................ 60/39.07; 60/39.183
[58] Field of Search ............ 60/39.07, 39.183, 39.141, 60/39.45, 39.83; 98/1.5; 244/118.5, 209, 58

[56] References Cited

U.S. PATENT DOCUMENTS

| | | | |
|---|---|---|---|
| 2,728,246 | 12/1955 | Korkosz | 74/675 |
| 2,771,791 | 11/1956 | Bachman | 74/675 |
| 2,908,189 | 10/1959 | Parker et al. | 74/675 |
| 2,924,991 | 2/1960 | Whiting | 74/675 |
| 3,260,133 | 7/1966 | Mattson | 74/675 |
| 3,298,251 | 1/1967 | Moss | 74/687 |
| 3,307,426 | 3/1967 | Whitaker | 74/675 |
| 3,514,945 | 6/1970 | Austin | 60/39.16 |
| 4,068,468 | 1/1978 | Wood et al. | 60/39.141 |
| 4,193,262 | 3/1980 | Snell | 60/261 |
| 4,419,926 | 12/1983 | Cronin et al. | 98/1.5 |
| 4,503,666 | 3/1985 | Christoff | 60/39.07 |
| 4,514,976 | 5/1985 | Christoff | 60/39.07 |
| 4,679,462 | 7/1987 | Baits et al. | 74/687 |
| 4,684,081 | 8/1987 | Cronin | 244/58 |
| 4,708,030 | 11/1987 | Cordner | 74/686 |
| 4,733,155 | 3/1988 | Smith | 322/10 |
| 4,743,776 | 5/1988 | Baehler et al. | 290/31 |
| 4,749,150 | 6/1988 | Rose et al. | 244/209 |
| 4,777,376 | 10/1988 | Dishner | 290/4 R |
| 4,875,345 | 10/1989 | Signoret | 62/402 |

FOREIGN PATENT DOCUMENTS 1530330 1/1976 United Kingdom .
2074654 4/1980 United Kingdom .

Primary Examiner—Louis J. Casaregola
Attorney, Agent, or Firm—Jerome C. Squillaro

[57] ABSTRACT

An aircraft gas turbine engine is provided with a compressed air supply system generally used for meeting customer or aircraft bleed air requirements. The compressed air supply system comprises an auxiliary compressor, a means for mechanically driving the system from a rotor of the gas turbine rotor, and a cycle varying means, such as a variable speed drive, for operating the auxiliary compressor cycle independently of the aircraft gas turbine engine compressor cycle. The preferred embodiment provides a means for bleeding boundary layer air off the nacelle or another part of the aircraft outer skin and using it as a source of air for the auxiliary compressor. One embodiment includes an air turbine on a common shaft with the auxiliary compressor and a means to direct an unused portion of the airflow form the auxiliary compressor to the air turbine to help power the auxiliary compressor and another embodiment includes a means to direct compressed startling air to the air turbine for on ground and in flight starting of the gas turbine engine through the variable speed drive and a mechanical linkage to the high rotor of the gas turbine engine.

21 Claims, 3 Drawing Sheets

AIRCRAFT ENGINE STARTER INTEGRATED BOUNDARY BLEED SYSTEM

BACKGROUND OF THE INVENTION

The invention relates to aircraft gas turbine engine systems for supplying aircraft system bleed air and starting the aircraft engine. In particular, the invention relates to an aircraft gas turbine engine integrated system for efficiently performing these functions and also reducing drag on engine nacelles or other surfaces by using laminar flow boundary layer air as the same air supplied to the aircraft bleed air system.

Modern day aircraft use gas turbine engines which in addition to propulsion, provide secondary functions required by the aircraft systems. These secondary functions include electrical power, hydraulic power and aircraft bleed air. Bleed air is normally taken from the engine compressor and, after precooling with engine fan air in a heat exchanger, is delivered to various aircraft systems such as cowl and wing anti-ice system and the cabin pressurization and environmental control system for controlling cabin air freshness and temperature These two systems are generally referred to as the anti-ice and ECS systems respectively. As part of the aircraft air ducting system, air is also routed in reverse flow to the engine where it powers an air turbine engine starter. Air for engine starting can be obtained from a ground cart, an on-board auxiliary power unit or bleed air from another engine.

Extraction of aircraft bleed air from the engine compressor has adverse affects on the propulsion cycle and engine life. Air taken into the engine compressor incurs a ram drag penalty (loss of momentum). Engine net thrust is equal to engine exhaust momentum minus inlet ram drag. Engine turbine power is needed to compress air and account for compressor inefficiency. Therefore, extra fuel consumption is always associated with bleed air (air which does not produce thrust). This extra fuel burned in the engine combustor results in higher gas temperature delivered to the engine turbine and reduction of turbine blade life. Such penalties must be incurred in order that the engine turbine provide extra power associated with bleed air. It is not possible, without undue complexity, to always bleed the engine compressor stage which provides exactly the correct pressure needed for the aircraft anti-ice and ECS systems. Typically only two bleed ports are provided. Therefore, the result is to bleed air which exceeds minimum pressure requirements resulting in even higher penalty to the engine cycle than would be required by the aircraft systems. Most often the bleed air is not only at a higher than required pressure, it is also too hot. For reasons of fire safety, maximum bleed air temperature is usually limited to 450° to 500° F. Temperature control requires cooling the bleed air with a precooler. Most modern engines use fan air to cool compressor bleed air. Use of fan air imposes an additional penalty on fuel consumption. Further, the precooler is usually large and requires a fan air scoop which produces drag. A typical large turbofan engine will consume about 3% extra fuel and run at about 50° F. hotter turbine temperature in order to provide aircraft system bleed air. The present invention addresses these problems and deficiencies characteristic of the prior art and conventional apparatus used to supply aircraft bleed air.

A second aspect of this invention concerns the engine air driven starter. Air starters are conventionally air powered turbines mounted to the engine accessory gearbox. The starter turbine rotates at very high speed and drives the engine through a planetary gear system during engine acceleration to just below idle speed. Once the engine lights it begins to develop its own power and, at a speed below idle, accelerates away from the starter. An overrunning mechanical clutch allows the starter to disengage and then the starter air is shutoff and the starter turbine comes to rest. During the remainder of the flight the starter is not used for any purpose and simply represents extra weight carried around by the aircraft. Within a very narrow flight profile of the aircraft, the starter can sometimes be used for emergency engine relight, but only at conditions where the windmill speed of the engine is low enough that the starter clutch can be engaged without damage due to what is referred to as crash engagement. Engine starters can not be used during normal aircraft cruise conditions; where the only means for relight is from the freely windmilling engine. One advantage of the present invention is that it permits operation of the air starter during all aircraft flight conditions thereby avoiding the delay in engine relight which can be associated with flight conditions unfavorable for fast windmill relights. The present invention further enhances the solution to the relight problem by using the starter turbine during all operation conditions as a means for improving the performance of the auxiliary bleed air compressor.

A third aspect of this invention concerns cooling the engine compartment. Cooling air is conventionally removed from the engine fan duct and used as ventilation cooling air for engine accessories mounted outside the main engine casing. This is particularly necessary for electronic controls and electrical components. Cooling air is also used in conjunction with compressor and turbine clearance control systems; systems which control the gap between rotating blade and adjacent casing walls to prevent rubs and excessive clearance. Another fuel saving advantage of one embodiment of the present invention is to use the turbine associated with the engine starter and auxiliary bleed air compressor as a means for cooling air which can then be used for engine compartment cooling, electronic control cooling or clearance control.

A fourth aspect of this invention relates to aerodynamic drag associated with engine nacelles, pylons and other aero-flowpath surfaces. As air flows on to and over a surface such as an engine nacelle it progressively builds up a low velocity boundary layer of increasing thickness. Within this boundary layer a portion of the velocity component of free stream total pressure is converted to increased static pressure. As the result of rise in static pressure, boundary layer thickness, and diffusion a point is reached where back pressure causes an otherwise laminar boundary layer to become turbulent. In the turbulent region a considerable amount of total pressure is converted to static temperature represented thermodynamically as an increase in entropy. By the time the boundary layer leaves the surface, or in the particular case of an aircraft gas turbine engine the end of the nacelle, an unrecoverable loss in total pressure has occurred. The large entropy rise associated with turbulence is at the expense of air momentum. Turbulence also gives rise to increased static pressure which may increase the intensity of rearward acting pressure force on the surface. Now if the boundary layer thickness is kept small, separation and turbulence will not occur and drag can be substantially reduced. One way to avoid increase in boundary thickness is to pump or bleed off boundary layer air through holes in the surface. Boundary layer pumps or compressors would be desirable from an aerodynamic standpoint but because of the relatively large air flow rates associated with effective boundary layer pumping or bleeding, the concept has not been adapted to modern aircraft and engines. Therefore, one problem this invention is directed at is to effectively and economically use the engine auxiliary compressor to pump and compress the laminar flow boundary layer air.

In order to maximize performance of the present invention, the preferred embodiment of the present invention addresses a problem relating to matching the auxiliary compressor's operating line (pressure ratio and flow) with the aircraft systems required schedule for pressure and flow, conventionally supplied by engine bleed air. Operating conditions always occur where the system wants higher pressures at lower flows then the compressor can deliver without stall (too low a flow for the operating speed needed to produce the required pressure). The compressor must be allowed to pass extra flow and avoid stall. However, this extra flow is an added loss in terms of both extra power into the compressor and added ram drag associated with bringing the air on board the engine (also extra fan power if the air source is the fan duct). The preferred embodiment of the present invention provides an economical fuel saving solution to this problem as opposed to just dumping the unused flow. The invention provides a means to extract power from this extra flow after its compression. Furthermore, after the extra flow passes through the air turbine which is also used to start the engine and after it is expanded and useful power has been extracted to help drive the compressor, the extra flow is used to cool the engine compartment, electronic control, or as part of the clearance control system.

It is, therefore, an object of the present invention to provide a more efficient and longer life aircraft gas turbine engine by reduction or elimination of engine compressor bleed and its associated fan air precooler.

Another object of the present invention is to provide a fuel efficient system for supplying compressed air to the aircraft anti-ice and ECS systems.

Another object of the present invention is to provide the engine with a quick and reliable in flight restart or relight capability.

Yet another object of the present invention is to provide the engine with a starter that avoids the need for crash engagement for in flight relight.

Another object of the present invention is to provide cooling air to cool the engine compartment, electronic control or as part of the clearance control system.

A further object of the present invention is to reduce aircraft drag in a fuel efficient manner.

A further object of the present invention is to reduce the cost and complexity of the aircraft gas turbine engine.

Yet a further object of the present invention is to simplify the valving and ducting associated with an aircraft gas turbine engine.

These objects and other features and advantages will become more readily apparent in the following description when taken in conjunction with the appended drawings.

SUMMARY OF THE INVENTION

Briefly, in accordance with one aspect of the present invention, an aircraft gas turbine engine is provided with an auxiliary compressed air system including an auxiliary compressor to supply aircraft bleed air often referred to as customer bleed air, a means for mechanically driving the auxiliary compressor from a rotor of the gas turbine engine, and a cycle varying means for operating auxiliary compressor's cycle independently than that of the aircraft gas turbine engine compressor. In a more particular embodiment the cycle varying means comprises a variable speed drive in mechanical drive relationship with the compressor and driven by a gas turbine engine rotor. A more particular embodiment includes an air turbine mounted on a common shaft with the auxiliary compressor and a means to direct air to said turbine effective for starting said gas turbine engine and an engine electronic control system for controlling said system.

According to another embodiment of the present invention, an aircraft gas turbine engine having a nacelle is provided with a perforated outer skin connected to an annular plenum below the perforated skin. The plenum is ducted to a auxiliary compressor which pumps or bleeds the boundary layer off the perforated portion of the nacelle. The compressor discharge is flowed to an air turbine which in turn is in mechanical drive relationship with the compressor. The compressor is driven through a mechanical linkage by a variable speed drive which is driven off of the power takeoff or accessory drive shaft of the gas turbine engine and the variable speed drive is controlled by an electronic control. In one embodiment of the invention, the compressor and turbine employ variable inlet guide vanes and nozzles to optimize the systems performance. In the preferred embodiment the compressor and turbine are on the same shaft as an output shaft from the variable speed drive. Ducting including valves are provided to allow at least a portion of the compressor discharge air to be supplied to an aircraft bleed duct where it may be used to meet aircraft bleed requirements such as air conditioning and anti-icing. The remaining air is flowed and expanded through the air turbine which accomplishes three tasks. The first is to permit the compressor to pass more flow than that demanded by the aircraft bleed system thus avoiding compressor stall. The second is to extract energy from a portion of the compressor flow and the third is to expand the flow through the turbine to cool the flow and then flowing it into the engine compartment where it can be used to cool engine accessories, the electronic control or in conjunction with engine clearance control systems.

DETAILED DESCRIPTION OF THE PREFERRED EMBODIMENT OF THE INVENTION

Figure 1:
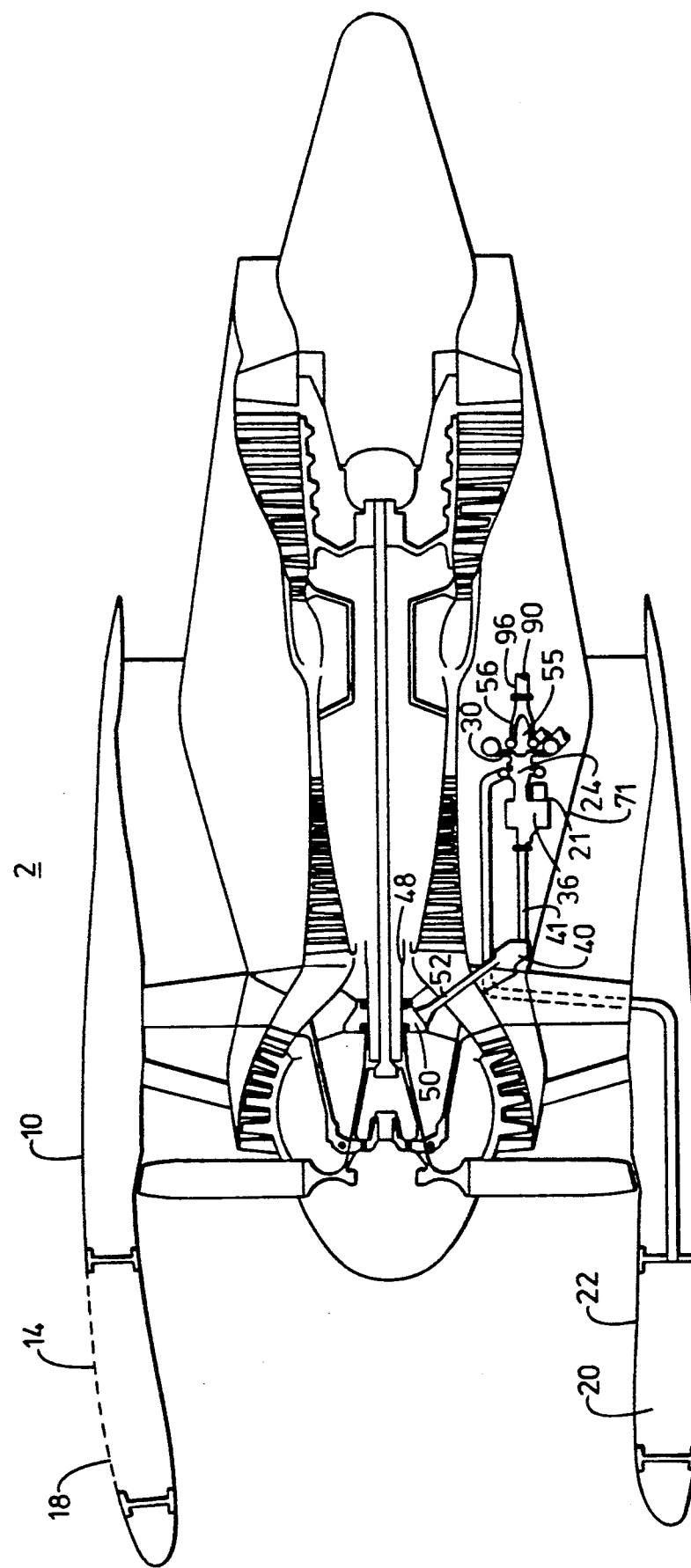
FIG. 1 is a cross sectional view of a gas turbine engine including a nacelle having a perforated front portion and one embodiment of the Starter Integrated Boundary Bleed System.

FIG. 1 illustrates a typical gas turbine engine 2 having one embodiment of the present invention which we refer to as Starter Integrated Boundary Bleed System which is hereinafter referred to as SIBBS and is designed to bleed or pump off a portion of the boundary layer from nacelle 10. Engine 2 includes nacelle 10 having a forward outer portion of the nacelle 14 upon which are disposed perforations 18 leading into an annular plenum 20 comprising a boundary layer bleed means 22. Alternatively the perforated forward portion 14 may be substituted with a porous skin or a skin with thin segmented slots running circumferentially around the nacelle for the purpose of bleeding a portion of the boundary layer to force laminar flow over a substantial portion of the nacelle and includes an auxiliary compressor 24 and an air turbine 56 on a common rotor 55 and a variable speed drive 36 which controls the speed of compressor 24. The preferred embodiment contemplates an assembly hereinafter referred to as the turbocompressor system 25 comprising auxiliary compressor 24, air turbine 56, and variable speed drive 36 wherein the auxiliary compressor and air turbine are mounted on a common rotor 55 which is coupled to or integral with output shaft 33 of the variable speed drive.

Figure 2:
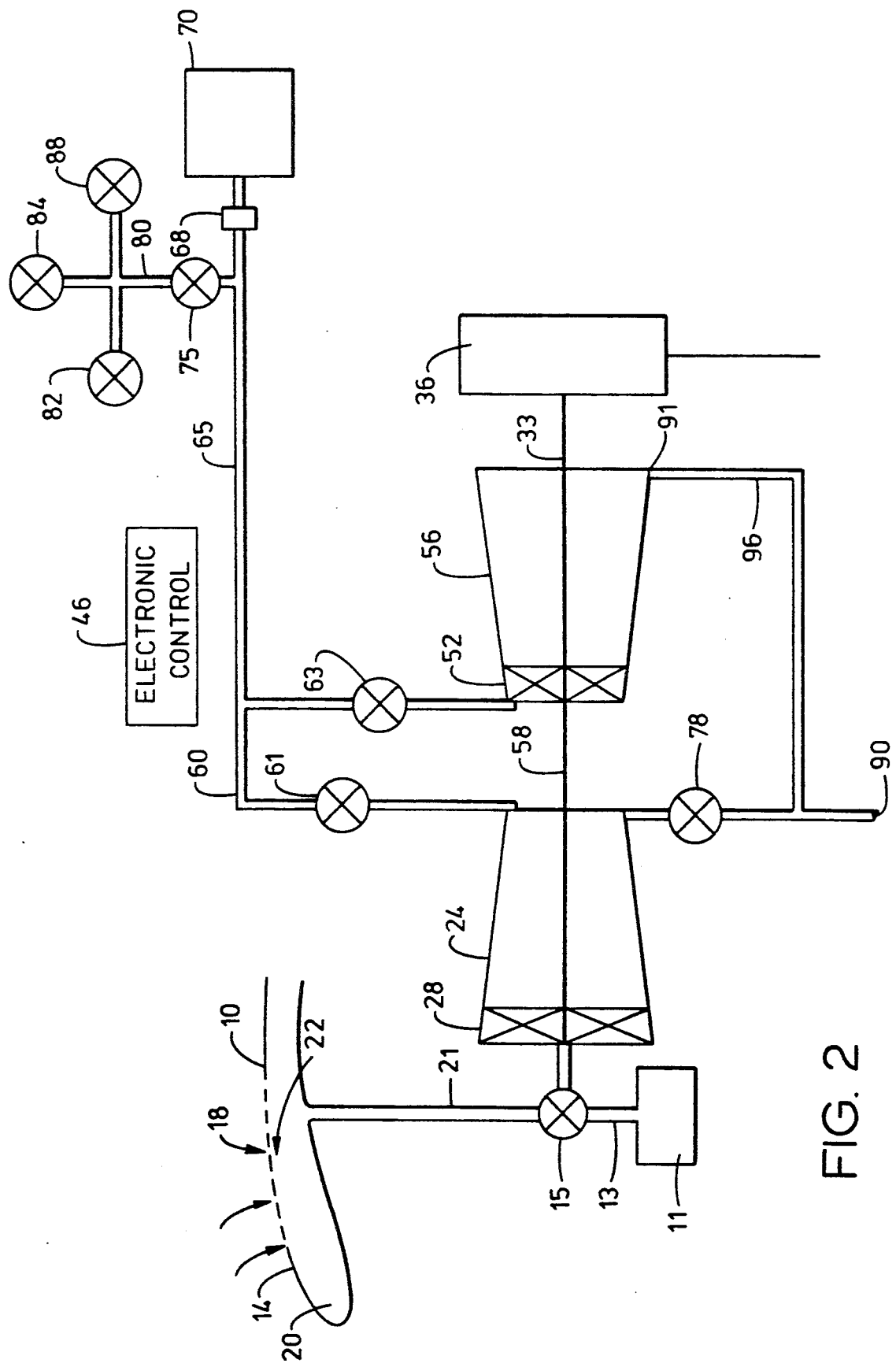
FIG. 2 is a schematic representation of the preferred embodiment generally depicting the elements and connecting ducting and valves of the present invention.

Referring to FIG. 2, plenum 20 is ducted to a variable vane compressor inlet 28 to auxiliary compressor 24. Auxiliary compressor 24 is driven through shaft 58, which diagrammatically depicts rotor 55 in FIG. 1, by a variable speed drive 36 whose speed is regulated by an engine electronic control 46. Alternatively, a separate electronic or hydro-mechanical controller may be used. The power is supplied to variable speed drive 36 from a gas turbine engine rotor shaft 48 through an internal gearbox 50 connected by way of a power take off shaft 52 to a transfer gearbox 40 which is drivingly connected to variable speed drive 36 by a drive shaft 41 which may be a flexible shaft.

The preferred embodiment depicted in FIG. 2 includes an inlet duct 21 connecting compressor 24 to its air supply plenum 20. An alternative air supply 11, fan duct air may be used, is in fluid supply communication with inlet duct 21 through alternate air supply duct 13 and a valve 15 is disposed between the inlet duct 21 and alternate air supply duct 13. Valve 15 is effective for controlling air flow to auxiliary compressor 24 thereby allowing air from the alternate air supply 11 to be used to meet higher inlet flow density requirements. System compressor 24 and an air turbine 56 are mounted on a common shaft 58 which may be connected to or an extension of the output shaft 30 of variable speed drive 36. Ducting 60 ducts the outflow of compressor 24 to a variable nozzle turbine inlet 57 of air turbine 56. A compressor valve 61 is disposed in ducting 60 downstream of system compressor 24 and a turbine valve 63 is disposed in ducting 60 between compressor valve 61 and air turbine 56. A SIBBS bleed duct 65 connects ducting 60, at a juncture point between the compressor valve 61 and turbine valve 63, to a bleed valve 68 from where compressed air is taken to meet aircraft bleed requirements, schematically represented by block 70 in FIG. 2., such as for anti-icing and air conditioning. During normal cruise operation a portion of the compressed air outflow of system compressor 24 is ducted through SIBBS bleed duct 65 to be used for various aircraft system requirements. Excess flow from compressor 24 is ducted to air turbine 56 through variable vane turbine inlet 57 where it is expanded through the turbine and used to return some energy to the system to help drive compressor 24. In the preferred embodiment a turbine exhaust duct 96 ducts the outflow of air turbine 56, where the flow has been expanded and cooled, to cooling duct 90 to which then flows it to a point located inside of core cowling 71 in FIG. 1 to provide cooling flow for use with the engine accessories, electronic control and clearance control systems.

As schematically illustrated in FIG. 2, air turbine 56 may also be used for ground and in-flight engine starts by using starting air from either a ground start air supply 82, an on-board auxiliary power unit 84, or an engine crossbleed air 88 which supply compressed air through a starting air supply valve 75 to aircraft bleed duct 70 to air turbine 56. The exhaust from air turbine 56 is then flowed through a turbine exhaust duct 96 into engine cooling duct 90. During engine starting, compressor valve 61 is closed and starting air supply valve 75 is opened. Compressor inlet vanes 28 are also closed so as to reduce the amount of power taken from turbine 56 to drive compressor 24. Auxiliary compressor dump valve 78 is opened to allow flow from compressor 24 to pass through to engine cooling duct 90.

Variable speed drive 36 helps provide the advantage of optimal utilization of auxiliary compressor 24 and air turbine 56 and speed matching of auxiliary compressor 24 and air turbine 56 to engine operating conditions. It reduces the engine starting time required because it can provide more power at peak turbine efficiency during engine starting. Another advantage is that, because it is always mechanically connected to the engine shaft 48 through the variable speed drive 36, it can quickly restart an engine that has experienced an in flight shutdown without crash engagement.

Figure 3:
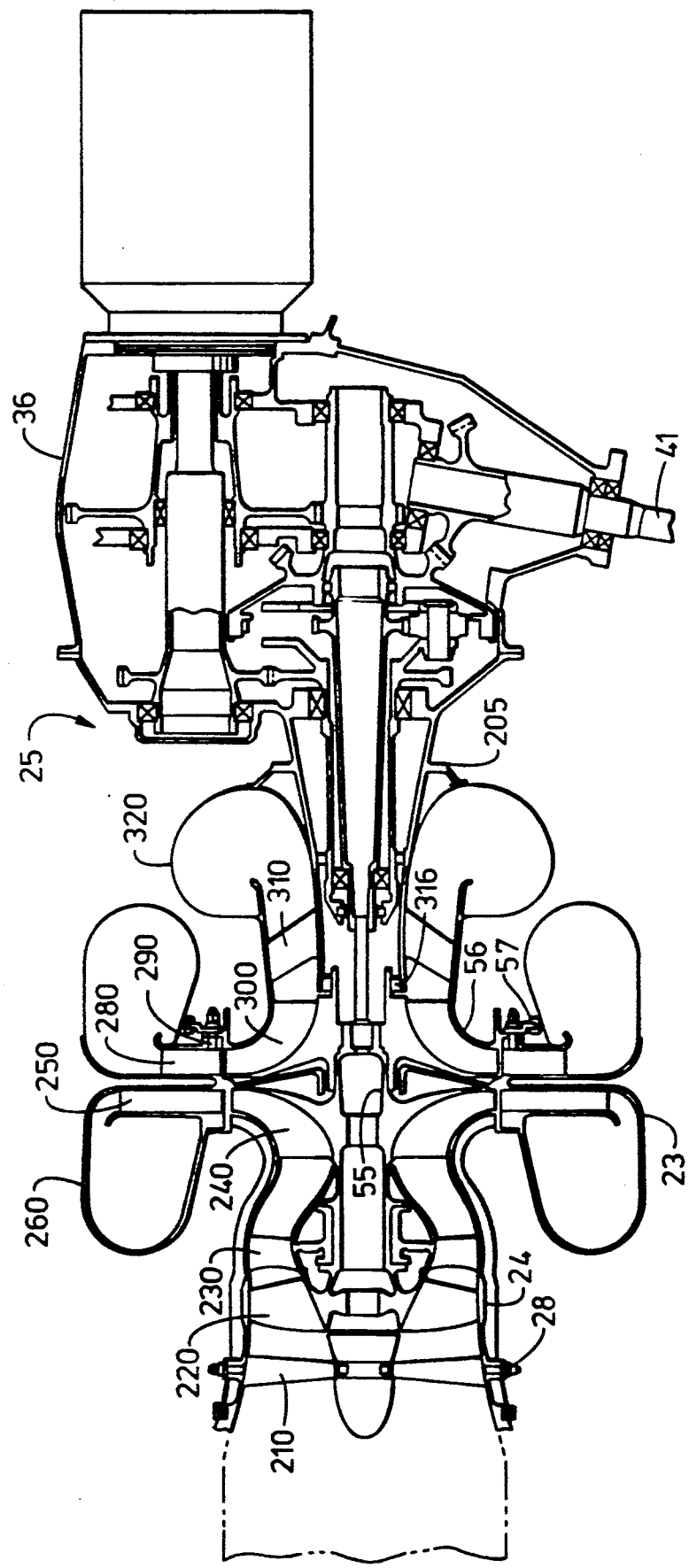
FIG. 3 is a cross sectional view of the auxiliary compressor and variable speed gearbox of the present invention.

The present invention includes more specific embodiments and various combinations of types of auxiliary compressor 24 and air turbine 56 are contemplated to maximize efficiency and match operating conditions of the aircraft engine. As shown in FIG. 3 the preferred embodiment comprises a two stage axial and centrifugal system compressor 24 and a single stage radial inflow stage air turbine 56. Other alternatives contemplated are a multiple stage axial system compressor 24 and a single stage axial air turbine 56 or a single stage centrifugal system compressor 24 and an axial impulse air turbine 56.

Referring to FIG. 3 the turbocompressor 23 is depicted as a single assembly or apparatus which comprises auxiliary compressor 24 and the air turbine 56 and is connected to variable speed drive 36 by flanges generally shown at 205. Auxiliary compressor 24 includes a variable vane compressor inlet 28 which has variable angle vanes 210 for controlling the air prerotation to compressor 24. Auxiliary compressor 24 has an axial first stage generally depicted by axial compressor blades 220 and axial stator vanes 230 and a centrifugal stage shown as a centrifugal compressor blade 240 and diffuse including stator 250. The rotating blades 220 and 240 are mounted on rotor 55. Turbocompressor 23 further includes compressor outlet scroll 260 which gathers the compressed air from diffuser 250 and ducts it to ducting 60 (shown in FIG. 2) which then, upon demand, ducts a portion of the compressed air from auxiliary compressor 24 or SIBBS bleed duct 65 in FIG. 2 to air turbine 56.

Turbocompressor 23 includes a turbine inlet scroll 270 effective for receiving compressed air from compressor 24 or SIBBS bleed duct 65 and ducting it to the variable nozzle turbine inlet 57 of air turbine 56. Variable turbine inlet 57 includes turbine inlet guide vanes 280 and turbine inlet variable nozzle vanes 290. Downstream of variable nozzle vanes 290 are radial inflow turbine blades 300 attached to common rotor 55 for extracting energy from the compressed airflow sent to air turbine 56 and imparting it to the common rotor. Downstream of the radial inflow turbine stage are struts 310 which provide structural supports for the rear bearing 316 of the turbocompressor. Turbine outlet scroll 320 collects the exhaust from the air turbine and conveys it to the turbine exhaust 91 of FIG. 2.

In the embodiment shown in FIG. 3 turbocompressor 23 is mounted forward of the variable speed device 36 generally at flanges 205 as contrasted to the embodiment as shown in FIG. 1 where the variable speed device is forward of the turbocompressor 23. The location of turbocompressor system 25 which comprises auxiliary compressor 24 and air turbine 56 depends on the needs and space availability of the particular aircraft and turbine engine installation. The compressor system can also be placed on top of the engine for example in the engine pylon.

The invention has various modes of operation for different flight operating conditions. In one embodiment of the invention under nominal operating conditions, with gas turbine engine 2 running, SIBBS is designed to reduce the drag on nacelle 10 by bleeding off the boundary layer from a forward portion or all of the nacelle 14. Referring to FIG. 2, compressor valve 61 is set open and valve 78 is set closed. Auxiliary compressor 24 then is able to bleed the boundary layer off of the forward portion 14 of nacelle 10 by drawing it through perforations 18 into plenum 20 then through compressor inlet duct 21. Auxiliary compressor 24 then supplies aircraft bleed air through SIBBS bleed duct 65 to aircraft bleed valve 68. Then the aircraft may use the air for conventional purposes such as anti-icing and conditioning of cabin air.

Turbocompressor system 25 is driven off the high pressure rotor 48 of gas turbine engine 2 by a series of drive shafts and gear boxes. For illustrative purposes the embodiment shown in FIGS. 1, 2 and 3 shows that the power is taken off the high pressure rotor 48 by an internal gearbox 50 and then transmitted to a variable speed drive 36 through a power takeoff shaft 52 to a transfer gearbox 40 which then drives a drive shaft 41 power takeoff shaft 52 is a radial drive shaft and the transfer gearbox 40 is a right angle gearbox which turns the power through a 90 degree turn. Other transmission arrangements and types of transmissions may be used to deliver the power to the variable speed drive 36 such as a direct drive off of the high rotor 48 or using a transfer gearbox that turns the power through an angle that is substantially less than 90 degrees, such as perhaps a 35 degree angle so that turbocompressor system 25 can be mounted in a particular location.

In the preferred embodiment, electronic control 46 controls the speed of auxiliary compressor 24 by adjusting the output speed of variable speed drive 36 and also calculates the proper speed at which to operate auxiliary compressor 24 in order to provide the desired pressure and flow rate of output from the compressor. Control 46 also provides overspeed, overtemp, and stall protection for the auxiliary compressor 24 and air turbine 56. At low altitude when auxiliary compressor 24 is operated at reduced corrected flow the variable vane compressor inlet 28 is gradually closed but not shut off in order to provide more stall margin for the auxiliary compressor. The excess flow from auxiliary compressor 24 is ducted through ducting 60 to air turbine 56 by opening turbine valve 63. The amount of flow passing through the air turbine is modulated by controlling variable nozzle turbine inlet 57 using electronic control 46. The exhaust from air turbine 56 is directed through turbine exhaust duct 96 into a cooling duct 90 which in this particular embodiment is located within the core cowling, as shown in FIG. 1, and is used to cool various engine accessories, electronic controls and in conjunction with the engine clearance control systems.

Air turbine 56 is primarily used for starting engine 2 and therefore is connected through ducting 60 and SIBBS bleed duct 65 to aircraft air duct 70. In the case of an in flight engine shut down and subsequent restart the similar compressor system, such as a SIBBS, of another engine that is operating can be used to supply pressurized air through aircraft duct system 70 to start the engine which is shut down. Such a system is often referred to as crossbleed.

Engine start is accomplished by flowing air through aircraft air system duct 70 to SIBBS bleed duct 65. Compressor valve 61 is closed. Dump valve 78 is opened and variable vane compressor inlet 28 is nearly fully closed in order to minimize power to compressor 24 during the starting process. Turbine valve 63 is gradually opened to bring air turbine 56 up to a predetermined speed, which for our purposes we have found to be about 25,000 RPM. Variable speed drive 36 is controlled by electronic engine control 46 so as to provide a nearly constant torque to engine rotor 48 during the initial stage of engine rotation. Above a predetermined lightoff speed, a speed at which the engine combustor can be lit without causing engine compressor stall or excessive turbine temperatures, electronic engine control 46 adjusts variable speed drive 36 in order to deliver a constant predetermined horsepower to engine 2 and also adjusts the variable nozzle turbine inlet 57 to operate air turbine 56 at a variable speed and constant horsepower output.

The present invention has been described in an illustrative manner. It is to be understood that the terminology which has been used is intended to be in the nature of words of description rather than of limitation.

Obviously, many modifications and variations of the present invention are possible in light of the above teachings. It is, therefore, to be understood that within the scope of the appended claims, the present invention may be practiced otherwise than as specifically described.

What is claimed is:

1. An apparatus for supplying an aircraft with auxiliary compressed air and integral with an aircraft propulsive gas turbine engine having a rotor, said apparatus comprising:

an auxiliary compressor for supplying the auxiliary compressed air, a means for mechanically driving said auxiliary compressor from the rotor of the gas turbine engine, a cycle varying means for operating the cycle of said auxiliary compressor independently from the cycle of the aircraft gas turbine engine, an air turbine on a common shaft with said auxiliary compressor, a means capable of supplying a portion of the auxiliary compressed air from said auxiliary compressor to said air turbine, and a means for supplying compressed starting air to said air turbine.

2. An apparatus as claimed in claim 1 wherein said cycle varing means comprises a variable speed drive in mechanical drive relationship with said auxiliary compressor and drivingly connected to the gas turbine engine rotor.

3. An apparatus as claimed in claim 2 wherein said cycle varying means further comprises an electronic control system for controlling said apparatus.

4. An apparatus as claimed in claim 3 wherein the compressed starting air is supplied from the engine crossbleed system.

5. An apparatus for bleeding boundary layer air and supplying aircraft auxiliary compressed air and integral with an aircraft propulsive gas turbine engine comprising:

a bleed means for collecting boundary layer air from an aircraft's outer skin, an auxiliary compressor, for supplying the auxiliary compressed air, in fluid supply communication with said bleed means effective for compressing bleed air supplied from said bleed means, a first ducting means to convey at least a portion of the compressed air from said auxiliary compressor to supply aircraft bleed air requirements, a transmission means connecting said compressor to the rotor of the gas turbine engine in a manner effective for driving said compressor off a rotor of the engine, an air turbine drivingly connected to said compressor, and a starting air supply means in switchable fluid supply communication with and effective for supplying compressed starting air to said air turbine.

6. An apparatus as claimed in claim 5 further comprising an alternative air supply in selectable fluid supply communication with said auxiliary compressor and a selecting valve disposed between said bleed means and said alternate air supply, said selecting valve in fluid supply communication with said auxiliary compressor and effective for controlling air flow to auxiliary compressor from said bleed means and said alternate air supply.

7. An apparatus as claimed in claim 6 wherein said transmission means includes a variable speed drive located in driving relationship between the engine rotor and said compressor.

8. An apparatus as claimed in claim 6 further comprising:

a second ducting means for flowing a second portion of the compressed air from said compressor to said air turbine for powering said air turbine.

9. An apparatus as claimed in claim 7 further comprising:

a second ducting means for flowing a second portion of the compressed air from said compressor to said air turbine for powering said air turbine.

10. An apparatus as claimed in claim 9 further comprising:

a starting air supply means effective for supplying starting air to said air turbine.

11. An apparatus as claimed in claim 10 further comprising:

an electronic control system for controlling said variable speed drive.

12. An apparatus as claimed in claim 11 wherein said electronic control system is effective for selectively controlling said first and second ducting means and said starting air supply means.

13. An apparatus as claimed in claim 12 further comprising: a first valve means for selecting either starting air or auxiliary compressor discharge air to be supplied to said air turbine.

14. An apparatus as claimed in claim 13 wherein said starting air supply system includes a means for selectively using ground starting air or in flight starting air for supplying starting air to said air turbine.

15. An apparatus as claimed in claim 14 wherein said second valve means is controlled by said electronic control.

16. An apparatus as claimed in claim 12 further comprising: a first valve means for selecting either starting air or auxiliary compressor discharge air to be supplied to said air turbine.

17. An apparatus as claimed in claim 8 further comprising:

a dump means for selectively flowing a third portion of the compressed air from said auxiliary compressor to a dump, said dump means including a dump valve for controlling said third portion of compressed air to be flowed.

18. An apparatus as claimed in claim 17 further comprising an air turbine exhaust means including a turbine exhaust duct for ducting at least a portion of the outflow of said air turbine to said dump means downstream of said dump valve.

19. An apparatus as claimed in claim 18 wherein said dump means is a cooling means and said dump is an area of the engine that requires cooling.

20. An apparatus as claimed in claim 19 wherein said area of the engine that requires cooling is located within the core cowling.

21. An apparatus as claimed in claim 19 wherein said area of the engine that requires cooling is an area containing engine accessories.

* * * * *